(12) United States Patent  (10) Patent No.: US 7,829,795 B2
Kawase et al.  (45) Date of Patent: Nov. 9, 2010

(54) ELECTROPHORETIC DISPLAY SHEET, ELECTROPHORETIC DISPLAY DEVICE, AND ELECTRONIC APPARATUS

(75) Inventors: Takeo Kawase, Suwa (JP); Hitoshi Yamamoto, Chino (JP); Takehisa Saeki, Suwa (JP); Tsutomu Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/392,123

(22) Filed: Feb. 25, 2009

(65) Prior Publication Data

US 2009/0180173 A1 Jul. 16, 2009

Related U.S. Application Data

(63) Continuation of application No. 11/657,929, filed on Jan. 25, 2007.

(30) Foreign Application Priority Data

Dec. 28, 2006 (JP) ............................. 2006-354016

(51) Int. Cl.
 *H05K 1/00* (2006.01)
(52) U.S. Cl. ..................... 174/254; 361/749
(58) Field of Classification Search ........... 174/254; 361/749–751
See application file for complete search history.

(56) References Cited

U.S. PATENT DOCUMENTS 5,166,774 A * 11/1992 Banerji et al. ............... 361/749
6,319,743 B1 * 11/2001 Marchant et al. ............. 438/50
6,686,940 B2 2/2004 Matsuura et al.
6,853,477 B2 2/2005 Nomoto et al.
7,310,458 B2 * 12/2007 Wehrly, Jr. .................. 385/14
7,362,404 B2 4/2008 Tadaki et al.
7,408,697 B2 8/2008 Kawai
7,495,821 B2 2/2009 Yamakita et al.

FOREIGN PATENT DOCUMENTS

| CN | 1677196 A | 10/2005 |
| JP | 10-054992 A | 2/1998 |
| JP | 10-125931 A | 5/1998 |
| JP | 11-26733 A | 1/1999 |
| JP | 2004-327836 A | 11/2004 |

OTHER PUBLICATIONS

Final Office Action received in U.S. Appl. No. 11/657,929; Sep. 2, 2009.
Non-Final Office Action received in U.S. Appl. No. 11/657,929; Nov. 13, 2008.

* cited by examiner

*Primary Examiner*—Jeremy C Norris
(74) *Attorney, Agent, or Firm*—AdvantEdge Law Group, LLC

(57) ABSTRACT

In at least one embodiment of the disclosure, a driving substrate includes a substrate having a first portion and a second portion formed surrounding the first portion. A flexible printed circuit is formed on the second portion. The flexible printed circuit includes a protruding portion extending to the first portion.

9 Claims, 10 Drawing Sheets

ELECTROPHORETIC DISPLAY SHEET, ELECTROPHORETIC DISPLAY DEVICE, AND ELECTRONIC APPARATUS

REFERENCE TO RELATED APPLICATIONS

This application is a continuation of U.S. patent application Ser. No. 11/657,929 filed Jan. 25, 2007, which claims priority from Japanese Patent Application No. 2006-354016 filed on Dec. 28, 2006, each of which is hereby incorporated by reference in its entirety.

BACKGROUND

1. Technical Field

An aspect of the present disclosure relates to an electrophoretic display sheet, an electrophoretic display device, and an electronic apparatus using electrophoretic migration in which charged particles in a medium migrate by applying a voltage to form images, in particular, an electrophoretic display device, and an electronic apparatus enabling to avoid damage to a driving circuit by reducing stress applied to a driving substrate when an electrophoretic display sheet is attached to the driving substrate.

2. Related Art

An electrophoretic display device (so-called EPD display device) provided with an electrophoretic element is a display device using electrophoretic migration in which particles dispersed in a solvent migrate by applying a voltage. As for methods for electrophoretic migration, for example, a microcapsule type, a horizontal migration type, and a vertical type have been developed. EPD display devices are easily processed and handled compared to LCDs, thereby being expected to be used for mobile equipment and information equipment.

An electrophoretic display device is formed by attaching an electrophoretic display sheet in which an electrophoretic element is formed on a transparent plastic substrate, and a driving substrate provided with an element and an electrode driving the electrophoretic display sheet.

Stress caused in an attaching process makes an end of an electrophoretic display sheet dig into a driving substrate, and a transparent electrode provided on an electrophoretic display sheet comes in contact with a driving electrode, causing a short circuit or damage to a circuit of a thin-film transistor. To avoid such problems, a protection sheet is commonly formed on an end of a driving substrate to protect a driving circuit from an end of an electrophoretic display sheet.

However, in a method of related art, a process to attach a protection sheet is required. In addition, a space having a certain area is needed to attach the protection sheet on a driving substrate.

Further, a protection sheet normally needs to have the thickness from about 50 µm to 100 µm to ensure strength as a sheet. This thickness is larger than that of a display layer of an electrophoretic capsule (from 20 µm to 30 µm, for example), resulting in problems such as uplift of an electrophoretic display sheet around the protection sheet, and degradation of an electric characteristic.

When a soft material such as a plastic substrate is used as a rear substrate provided on a driving substrate to make an electrophoretic display flexible, aforementioned problems become even more prominent. That is, a driving circuit is susceptible to stress because of being formed on a plastic substrate. Therefore, a driving circuit on a plastic substrate is easily damaged by stress concentration when a driving substrate is pressed with an end of an electrophoretic display sheet to attach thereto.

The aforementioned problem may be avoided by designing an end of a transparent substrate to be formed outside of a circuit region of a driving substrate if an end of the driving substrate is not provided with an external connection terminal. However, in this case, unwanted patterns such as wiring and a driving circuit are displayed on the electrophoretic display sheet.

Further, if an end of a driving substrate is provided with an external connection terminal, unwanted patterns such as for wiring and a driving circuit are also displayed on an electrophoretic display sheet because of wiring communicating a circuit region on the driving substrate with the external connection terminal.

SUMMARY

Certain embodiments of the disclosure may prevent damage to a driving circuit caused when an electrophoretic display sheet is attached to a driving substrate, and provide the electrophoretic display sheet and an electrophoretic display device superior in display quality and an electric characteristic.

An electrophoretic display device superior in display quality and electric characteristic may be obtained by employing the electrophoretic display sheet while damage to the driving circuit caused when the electrophoretic display sheet is attached to the driving substrate is prevented. The electrophoretic display sheet may include an electrophoretic display layer; a transparent electrode layer; a transparent substrate provided with the transparent electrode layer, the transparent substrate being laminated on the electrophoretic display layer; and a stress-reducing member that reduces stress applied to the driving substrate including a semiconductor circuit layer in a case of attaching the electrophoretic display sheet to the driving substrate to be laminated with the electrophoretic display layer thereon.

Certain embodiments of the disclosure may include:

1) The electrophoretic display sheet at least including the electrophoretic display layer; the transparent electrode layer; the transparent substrate provided with the transparent electrode layer, the transparent substrate being laminated on the electrophoretic display layer; and the stress-reducing member that reduces stress applied to the driving substrate including the semiconductor circuit layer in a case of attaching the electrophoretic display sheet to the driving substrate to be laminated with the electrophoretic display layer thereon 2) The electrophoretic display sheet described in 1), wherein the stress-reducing member maybe an extension of an end of the transparent substrate extended to be further than an outer edge of the driving substrate, the extension coming in contact with at least a part of an upper surface of a flexible printed circuit provided on the driving substrate 3) The electrophoretic display sheet described in 1), wherein the stress-reducing member may be a buffer arranged on a lower part of an end of the transparent substrate to face to the driving substrate 4) The electrophoretic display sheet described in 1), wherein the stress-reducing member may be a protection sheet arranged on a lower part of an end of the transparent substrate, the protection sheet being preliminarily integrated with a flexible printed circuit provided on the driving substrate 5) The electrophoretic display sheet described in 1), wherein the transparent substrate may be flexible while the stress-reducing member may be a surface contact member in a lower part of an end of the transparent substrate coming in surface contact with a surface of the driving substrate in a case of attaching the electrophoretic display sheet to the driving substrate 6) The electrophoretic display sheet described in 5), wherein the surface of the lower part of the end may be chamfered to be a curved surface 7) The electrophoretic display sheet described in 6), wherein the curved surface may have a radius of curvature being one tenth or more of a thickness of the transparent substrate 8) The electrophoretic display sheet described in 6) or 7), wherein the end having the curved surface may be made of an elastic member 9) The electrophoretic display sheet described in 5), wherein the surface contact member may be a sprayed-out portion formed in the lower part of the end of the transparent substrate 10) An electrophoretic display device at least including the electrophoretic display sheet described in any one of 1) through 9), and a driving substrate provided with a semiconductor circuit layer and a flexible printed circuit 11) An electrophoretic display device at least including the electrophoretic display sheet described in any one of 5) through 9), a driving substrate provided with a semiconductor circuit layer and a flexible printed circuit, and a protection sheet formed on an upper part of an end of the transparent substrate coming in surface contact with a surface of the driving substrate 12) An electronic apparatus including the electrophoretic display device described in 10) or 11)

According to certain embodiments of the disclosure, stress on the driving substrate caused when the electrophoretic display sheet is attached to the driving substrate may be reduced while damage to the driving circuit is prevented, providing the electrophoretic display sheet and the electrophoretic display device superior in display quality and an electric characteristic.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

Embodiments of the disclosure will now be described. The embodiments shown below are examples. Therefore, the embodiments are not intended to limit the disclosure. Various patterns thereof can be performed without departing from the spirit and scope of the disclosure. Therefore, it is manifestly intended that embodiments in accordance with the present disclosure be limited only by the claims and the equivalents thereof. Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may. Several embodiments will sequentially be described under corresponding section headings below. Section headings are merely employed to improve readability, and they are not to be construed to restrict or narrow the present disclosure. For example, the order of description headings should not necessarily be construed so as to imply the relative importance of an embodiment.

The embodiments of the disclosure will now be described with reference to the accompanying drawings.

First Embodiment

Figure 1:
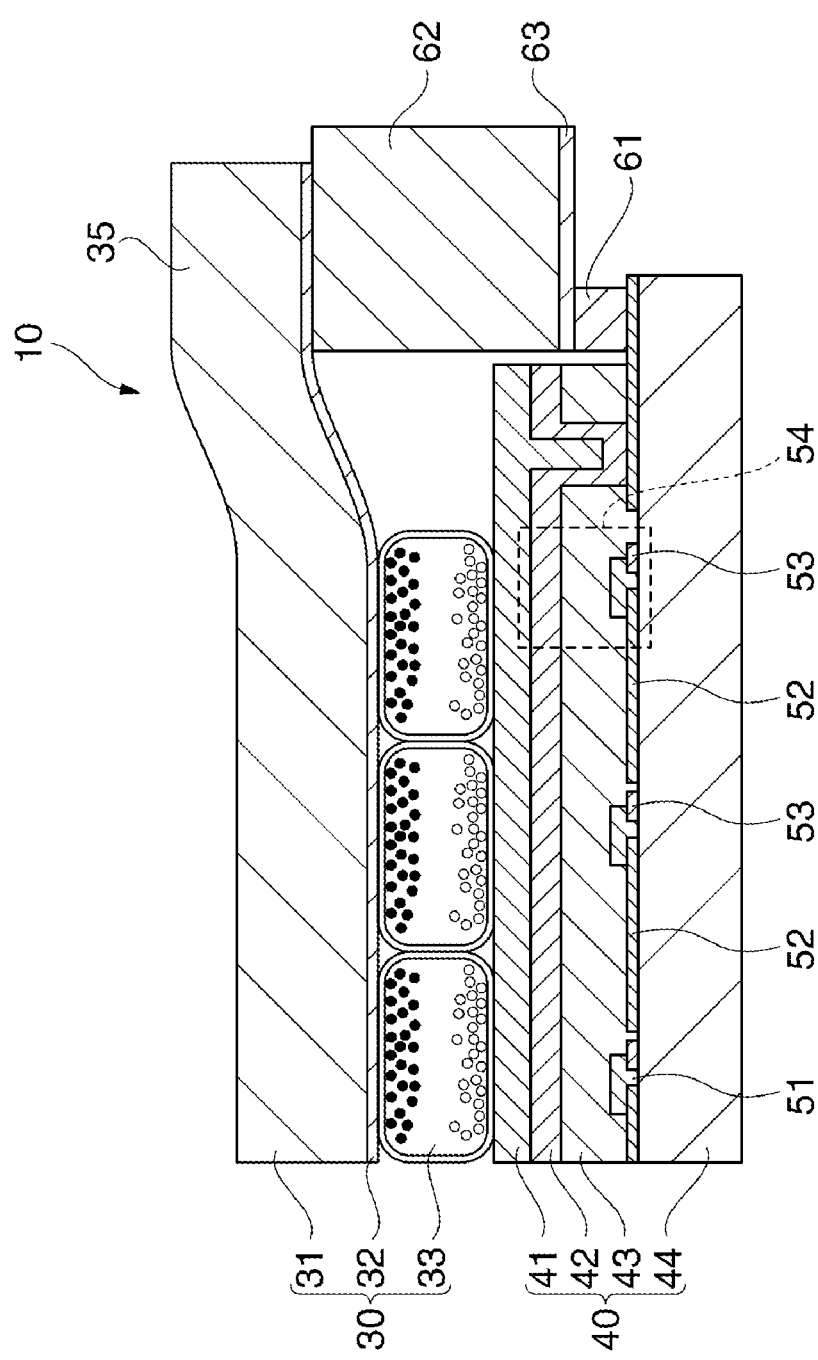
FIG. 1 is a sectional view showing a part of an electrophoretic display device 10 according to a first embodiment.
Figure 2:
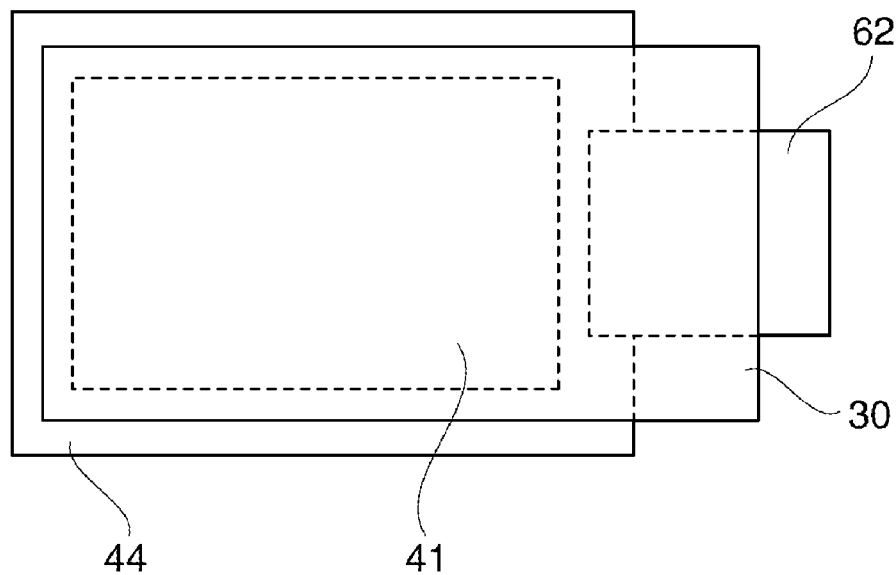
FIG. 2 is an overhead view of the electrophoretic display device 10 according to the first embodiment.

FIG. 1 is a sectional view showing a part of an electrophoretic display device 10 while FIG. 2 is an overhead view of the electrophoretic display device 10 according to a first embodiment.

As shown in FIGS. 1 and 2, the electrophoretic display device 10 includes an electrophoretic display sheet 30 and a driving substrate 40. In certain embodiments, the electrophoretic display device 10 may be formed by laminating the electrophoretic display sheet 30 having flexibility on the driving substrate 40 having flexibility.

The electrophoretic display sheet 30 includes an electrophoretic display layer 33 and a transparent substrate 31 laminated on the electrophoretic display layer 33 and having a transparent electrode 32 on the undersurface thereof. The transparent substrate 31 is made of a transparent insulating binder resin such as a polyethylene terephthalate (PET) film. The transparent electrode layer 32 is an indium tin oxide film (ITO film) having tin doped in.

The electrophoretic display layer 33 is provided with an electrophoretic dispersion liquid encapsulated in a microcapsule made of transparent resin. The electrophoretic dispersion liquid is made by encapsulating a transparent insulation liquid, white particles positively charged, and a black pigment negatively charged. Electrophoretic particles have a property to migrate in an electrophoretic dispersion liquid according to voltage application. The thickness of the electrophoretic display layer 33 is from 20 µm to 30 µm, for example.

The driving substrate 40 includes a rear substrate 44 as an insulating base substrate, and a semiconductor circuit layer 43, a gate wiring layer 42, and a protective layer 41 laminated subsequently on the rear substrate 44.

The rear substrate 44 may be a glass substrate, or a plastic substrate made of, for example, polycarbonate or the like in the thickness of 200 µm. On the rear substrate 44, a plurality of pixel electrodes 52, data lines 53, and organic semiconductors 51 are formed in the row and column directions with an ultraviolet (UV) cure adhesive or the like, thereby forming a plurality of thin-film transistors 54. A group of the pixel electrodes 52 arranged in a matrix forms a display area to display an image (two-dimensional information).

As the thin-film transistors 54, an organic TFT, an amorphous silicon TFT, and a poly Si TFT are used, for example.

In such a method for forming a thin-film semiconductor circuit on a substrate, a transferring method of a thin-film circuit shown in JP-A-10-125931, JP-A-11-26733, and JP-A-2004-327836 can be used. In the transferring method, a thin-film semiconductor circuit is formed on a heat-resistant substrate (glass substrate), and then the thin-film semiconductor circuit is transferred on a whole or part of a resin substrate.

At least one of the pixel electrodes 52 on an end part of the rear substrate 44 is coupled to a flexible printed circuit (FPC) 62 via an external connection terminal 61 and an anisotropic conductive film 63. The flexible printed circuit 62 is made of polyamide, for example.

An end of the transparent substrate 31 having a transparent electrode layer 32 formed has an extension 35 that is extended to be further than an outer edge of the driving substrate 40, and the extension 35 comes in contact with a part of the upper surface of the flexible printed circuit 62.

In the first embodiment, the end of the transparent substrate 31 is prevented from coming in contact with the driving substrate 40 because of the configuration above. That is, stress on the driving substrate 40 caused when the electrophoretic display sheet 30 is attached to the driving substrate 40 is reduced, providing an electrophoretic display sheet and an electrophoretic display device superior in display quality and an electric characteristic.

In the above, a display device provided with a display layer in an electrophoretic migration method of a microcapsule type is explained, however, embodiments of the disclosure are not limited to this. For example, a display device in an electrophoretic migration method of a horizontal migration type, or a vertical type is also possible.

Further, in the above, a case where the extension 35 comes in contact with a part of the upper surface of the flexible printed circuit 62 is explained. However, the extension 35 may come in contact with a whole surface of the flexible printed circuit 62.

Furthermore, according to the configuration above, a protection sheet is not necessarily formed on the upper side of the end of the driving substrate unlike related art.

Second Embodiment

Figure 3:
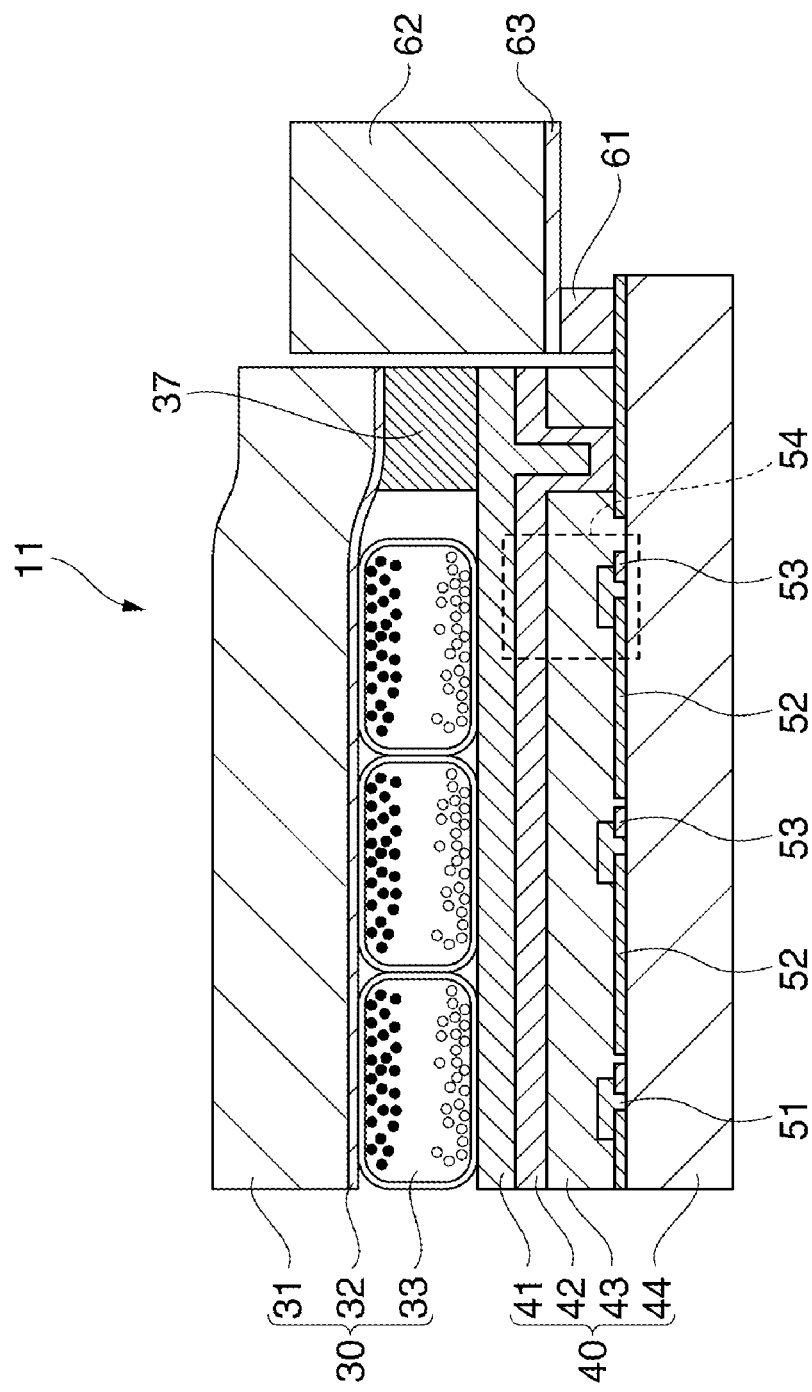
FIG. 3 is a sectional view showing a part of an electrophoretic display device 11 according to a second embodiment.

FIG. 3 is a sectional view showing a part of an electrophoretic display device 11 according to a second embodiment.

As shown in FIG. 3, the electrophoretic display device 11 in the second embodiment has a buffer 37 instead of the extension 35. This is the only difference between the first embodiment and the second embodiment. Like numbers refer to like parts in FIGS. 1 and 3, and the description thereof is omitted here.

The buffer 37 is arranged underneath the end of the transparent substrate 31 provided with the transparent electrode layer 32 to face to the driving substrate 40.

In the second embodiment, the end of the transparent substrate 31 is also prevented from coming in contact with the driving substrate 40. That is, stress on the driving substrate 40 caused when the electrophoretic display sheet 30 is attached to the driving substrate 40 is reduced, providing an electrophoretic display sheet and an electrophoretic display device superior in display quality and an electric characteristic.

Third Embodiment

Figure 4A:
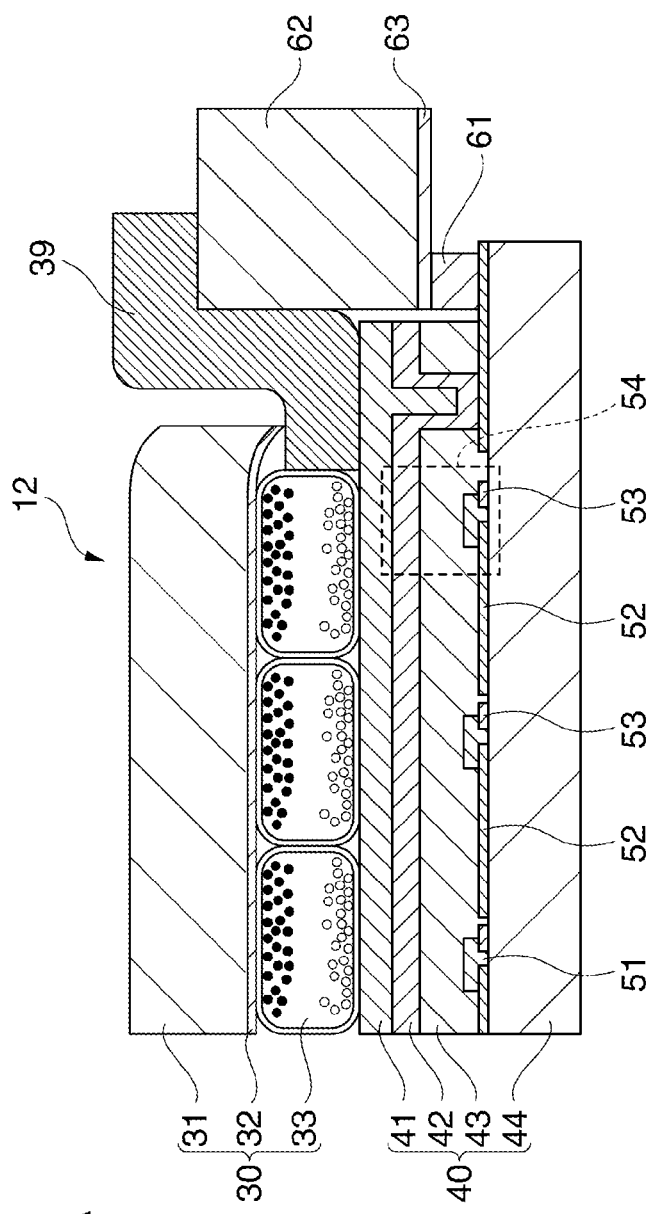
FIG. 4A is a sectional view showing a part of an electrophoretic display device 12 according to a third embodiment.
Figure 4B:
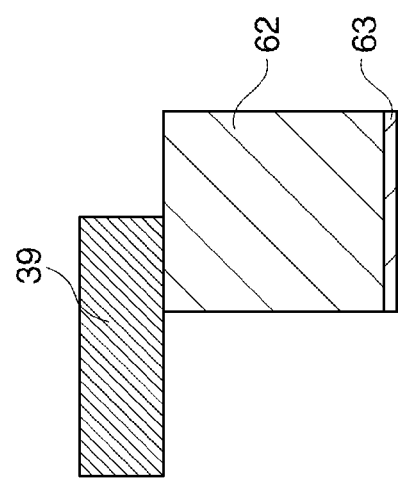
FIG. 4B is a diagram showing a state that a protection sheet 39, a flexible printed circuit 62, and an anisotropic conductive film 63 are integrated before assembly according to the third embodiment.
Figure 5:
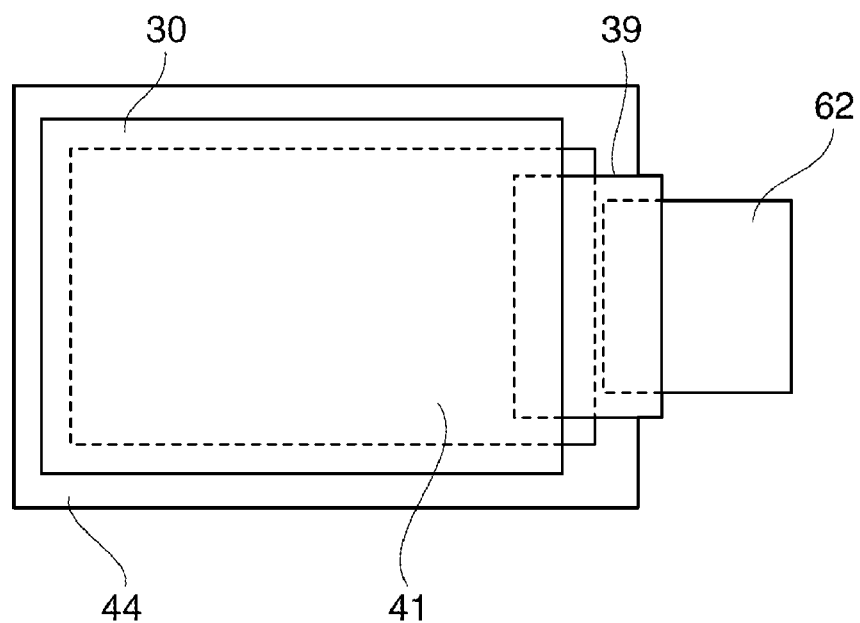
FIG. 5 is an overhead view of the electrophoretic display device 12 according to the third embodiment.

FIG. 4A is a sectional view showing a part of an electrophoretic display device 12 in a third embodiment. FIG. 4B is a diagram showing a state in which a protection sheet 39, the flexible printed circuit 62, and the anisotropic conductive film 63 are integrated before assembly. FIG. 5 is an overhead view of the electrophoretic display device 12.

As shown in FIGS. 4A, 4B, and 5, the electrophoretic display device 12 in the third embodiment has the protection sheet 39 instead of the extension 35. This is the only difference between the first embodiment and the third embodiment. As shown in FIG. 4B, an end of the protection sheet 39 is bonded onto the flexible printed circuit 62 provided on the driving substrate 40 to be preliminarily integrated.

As shown in FIG. 4A, by assembling a unit which is integrated as shown in FIG. 4B, the end of the protection sheet 39 is arranged between the driving substrate 40 and the transparent substrate 31 provided with the transparent electrode layer 32.

In the third embodiment, the end of the transparent substrate 31 is also prevented from coming in contact with the driving substrate 40. That is, stress on the driving substrate 40 caused when the electrophoretic display sheet 30 is attached to the driving substrate 40 is reduced, providing an electrophoretic display sheet and an electrophoretic display device superior in display quality and an electric characteristic.

Fourth Embodiment

Figure 6A:
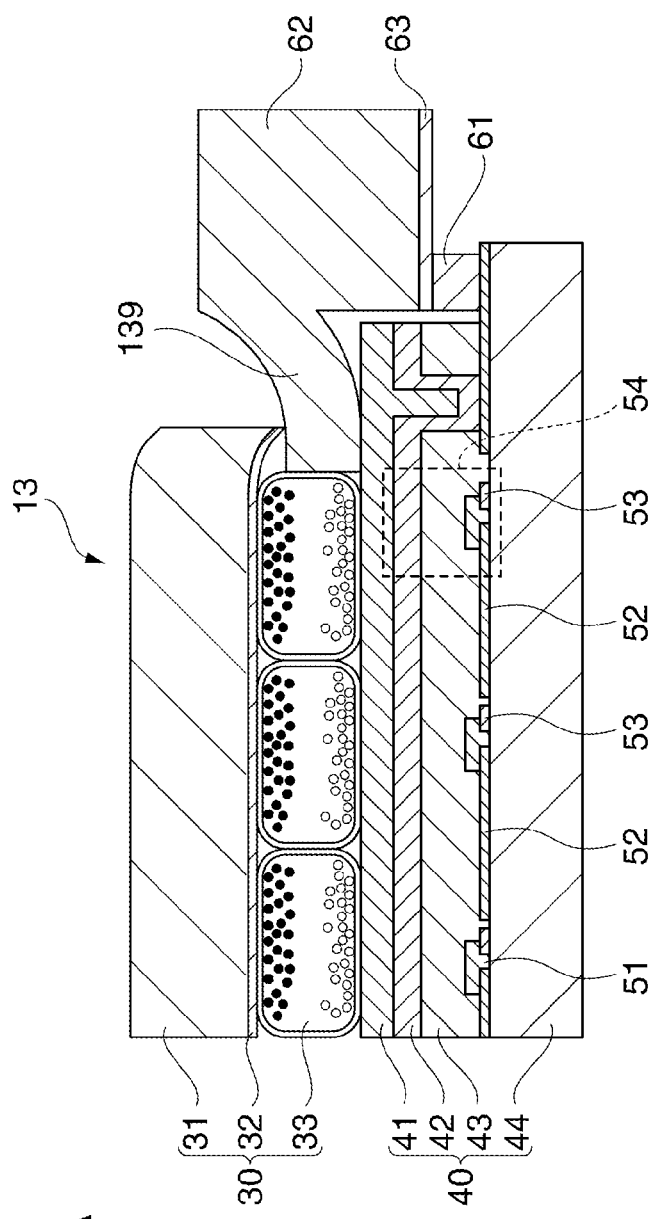
FIG. 6A is a sectional view showing a part of an electrophoretic display device 13 according to a fourth embodiment.
Figure 6B:
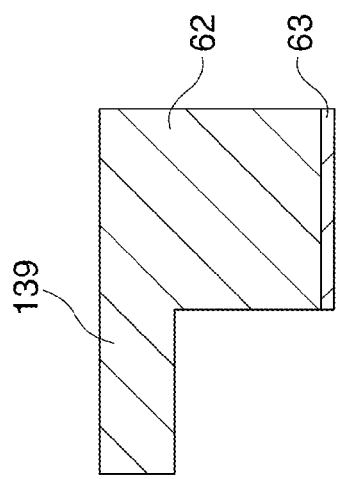
FIG. 6B is a diagram showing a state in which a protection sheet 139, the flexible printed circuit 62, and the anisotropic conductive film 63 are integrated before assembly according to the fourth embodiment.

FIG. 6A is a sectional view showing a part of an electrophoretic display device 13 in a fourth embodiment. FIG. 6B is a diagram showing a state in which a protection sheet 139, the flexible printed circuit 62, and the anisotropic conductive film 63 are integrated before assembly.

As shown in FIG. 6, the electrophoretic display device 13 in the fourth embodiment has the protection sheet 139 instead of the protection sheet 39. This is the only difference between the third embodiment and the fourth embodiment. As shown in FIG. 6B, the protection sheet 139 is made of resin that is the same as that making the flexible printed circuit 62 and preliminarily integrated before forming.

In the fourth embodiment, the end of the protection sheet 139 is also arranged between the driving substrate 40 and the transparent substrate 31 having the transparent electrode layer 32 as shown in FIG. 6A.

In the fourth embodiment, the end of the transparent substrate 31 is also prevented from coming in contact with the driving substrate 40. That is, stress on the driving substrate 40 caused when the electrophoretic display sheet 30 is attached to the driving substrate 40 is reduced, providing an electrophoretic display sheet and an electrophoretic display device superior in display quality and an electric characteristic.

Fifth Embodiment

Figure 7:
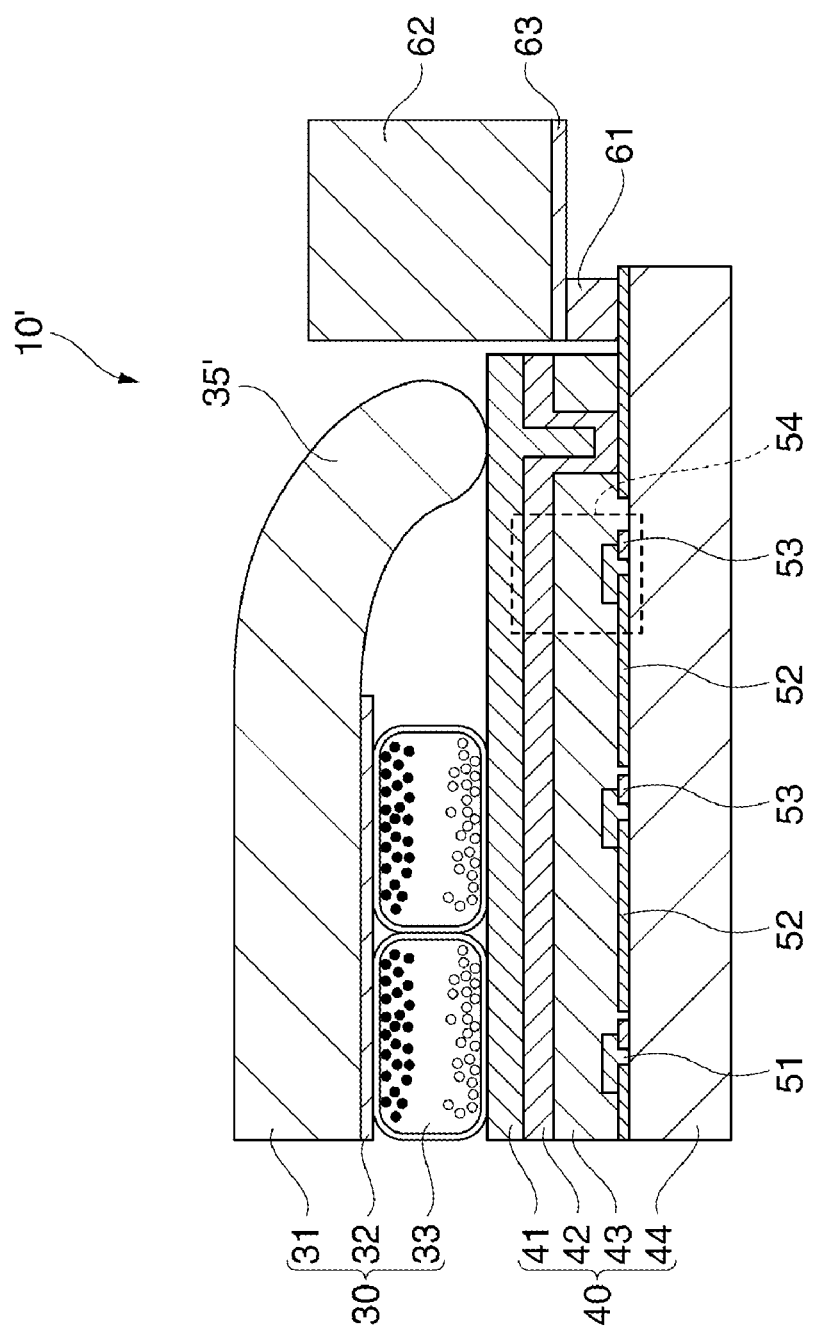
FIG. 7 is a sectional view showing a part of an electrophoretic display device 10' according to a fifth embodiment.

FIG. 7 is a sectional view showing a part of an electrophoretic display device 10' according to a fifth embodiment.

As shown in FIG. 7, the electrophoretic display device 10' includes the electrophoretic display sheet 30 and the driving substrate 40. In certain embodiments, the electrophoretic display sheet 30 and the driving substrate 40 may be flexible and the electrophoretic display device 10' may be formed with the electrophoretic display sheet 30 laminated on the driving substrate 40.

The electrophoretic display sheet 30 includes the electrophoretic display layer 33 and the transparent substrate 31 with flexibility laminated on the electrophoretic display layer 33 and having a transparent electrode 32 on the undersurface thereof. The transparent substrate 31 is made of transparent insulating binder resin such as a polyethylene terephthalate (PET) film. The transparent electrode layer 32 is an indium tin oxide film (ITO film) including tin doped in.

The electrophoretic display layer 33 is provided with an electrophoretic dispersion liquid encapsulated in a microcapsule made of transparent resin. The electrophoretic dispersion liquid is made by encapsulating a transparent insulation liquid, white particles positively charged, and a black pigment negatively charged. Electrophoretic particles have a property to migrate in an electrophoretic dispersion liquid according to voltage application. The thickness of the electrophoretic display layer 33 is from 20 μm to 30 μm, for example.

The driving substrate 40 includes the rear substrate 44 as an insulating base substrate, and the semiconductor circuit layer 43, the gate wiring layer 42, and the protective layer 41 laminated subsequently on the rear substrate 44.

The rear substrate 44 can be made of glass, or a plastic substrate such as, for example, a polycarbonate in the thickness of 200 μm. On the rear substrate 44, the plurality of pixel electrodes 52, the data lines 53, and the organic semiconductors 51 are formed in the row and column directions with an ultraviolet (UV) cure adhesive or the like, thereby forming the plurality of thin-film transistors 54. The group of pixel electrodes 52 arranged in a matrix forms a display area to display an image (two-dimensional information).

As the thin-film transistors 54, an organic TFT, an amorphous silicon TFT, and a poly Si TFT are used, for example.

In such a method for forming a thin-film semiconductor circuit on a substrate, a transferring method of a thin-film circuit shown in JP-A-10-125931, JP-A-11-26733, and JP-A-2004-327836 can be used. In the transferring method, a thin-film semiconductor circuit is formed on a heat-resistant substrate (glass substrate), and then the thin-film semiconductor circuit is transferred on a whole or part of a resin substrate.

At least one of the pixel electrodes 52 on an end of the rear substrate 44 is coupled to the flexible printed circuit (FPC) 62 via the external connection terminal 61 and the anisotropic conductive film 63. The flexible printed circuit 62 is made of polyamide, for example.

An end 35' of the transparent substrate 31 including the transparent electrode layer 32 has a curved surface by being chamfered on its lower part. When the electrophoretic display sheet 30 is attached to the driving substrate 40, the curved surface comes in contact with the driving substrate 40. The transparent substrate 31 is flexible, and further, the lower part of the end is chamfered. Therefore, in the contact area, a whole or part of the part having the curved surface comes in surface contact with an upper surface of the driving substrate.

In certain embodiments, the curved surface of the transparent substrate 31 may have a radius of curvature that is one tenth or more of the thickness of the transparent substrate, and in at least one embodiment, from one third to one.

According to the configuration described above, in the fifth embodiment, the lower part of the end of the transparent substrate 31 comes in surface contact with the surface of the driving substrate 40. Therefore, stress on the driving substrate 40 caused when the electrophoretic display sheet 30 is attached to the driving substrate 40 is reduced, preventing the driving circuit from being damaged or disconnected. As a result, an electrophoretic display sheet and an electrophoretic display device superior in display quality and an electric characteristic are provided.

In the above, a display device provided with a display layer in an electrophoretic migration method of a microcapsule type is explained, however, embodiments of the disclosure are not limited to this. For example, a display device in an electrophoretic migration method of a horizontal migration type, or a vertical type is also possible.

Further, the portion to be curved may be made of an elastic member. This can be formed by welding an elastomer to the lower part of the end of the transparent substrate 31 with heat. Having such an elastic member can more effectively prevent a driving circuit of the driving substrate 40 from being damaged or disconnected.

Sixth Embodiment

FIG. 6 is a sectional view showing a part of an electrophoretic display device 11' according to a sixth embodiment.

Figure 8:
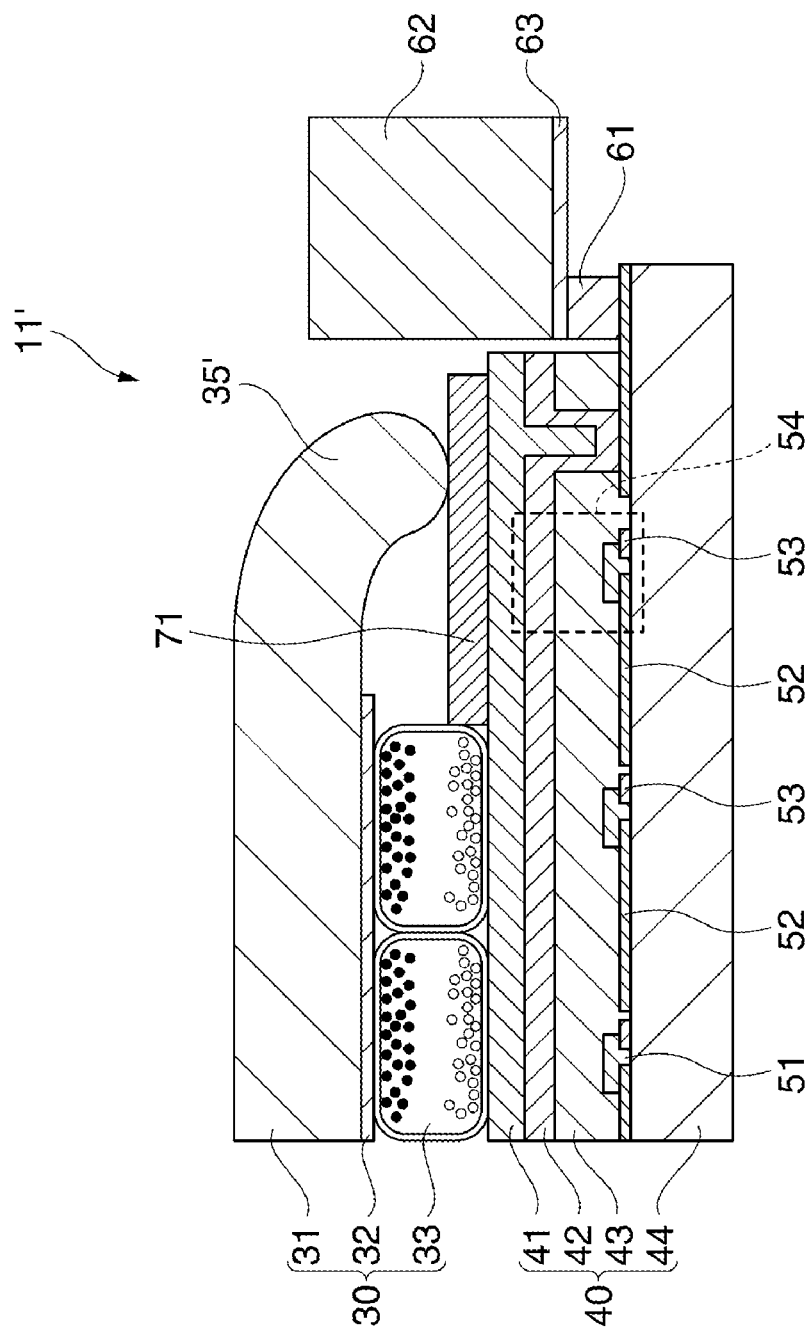
FIG. 8 is a sectional view showing a part of an electrophoretic display device 11' according to a sixth embodiment.

As shown in FIG. 8, the electrophoretic display device 11' in the sixth embodiment has a protection sheet 71 provided on the upper surface of the end of the driving substrate 40. This is the only difference between the fifth embodiment and the sixth embodiment. Like numbers refer to like parts in FIGS. 7 and 8, and the description thereof is omitted here.

Additionally having the protection sheet 71 can more effectively prevent the driving circuit of the driving substrate 40 from being damaged or disconnected.

Seventh through Ninth Embodiments

Figure 9A:
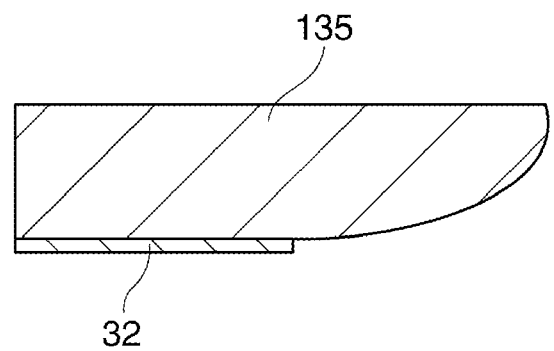
FIGS. 9A through 9C are diagrams showing ends of transparent substrates used in a seventh embodiment through a ninth embodiment.
Figure 9B:
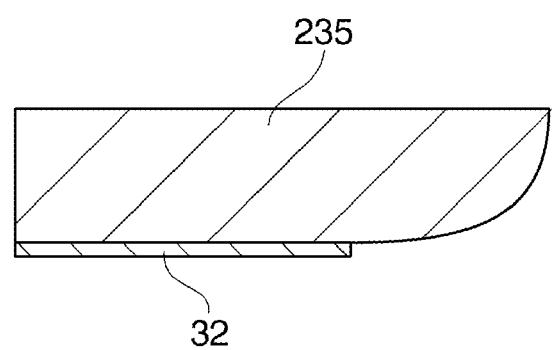
Figure 9C:
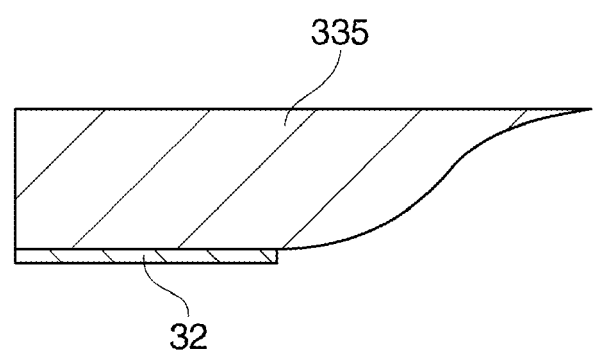

Each of FIGS. 9A through 9C shows an end of the transparent substrate before being assembled respectively for seventh through ninth embodiments.

The only difference between the seventh through ninth embodiments and the fifth embodiment is that transparent substrates 135, 235, and 335 are respectively used in the seventh through ninth embodiments instead of the transparent substrate 31 in the fifth embodiment. As shown in FIGS. 9A through 9C, each of the transparent substrates 135, 235, and 335 has a curved surface on a lower part of its end by being chamfered. Therefore, as is the case with the fifth embodiment, when the electrophoretic display sheet 30 is attached to the driving substrate 40, the curved surface comes in surface contact with the upper surface of the driving substrate 40.

In the seventh through ninth embodiments, stress on the driving substrate 40 caused when the electrophoretic display sheet 30 is attached to the driving substrate 40 is reduced, and damage to the driving circuit is prevented, similarly to the fifth embodiment.

[Method for Manufacturing Transparent Substrate]

The transparent substrate having the curved surface chamfered on its lower part of the end used in the fifth through ninth embodiments may be manufactured by various methods as follows: a) the transparent substrate is cut by a carbon dioxide laser to make the end round; b) the end of the transparent substrate is melted by heat application and pressed to a mold to be round; c) the end of the transparent substrate is melted by heat application and rounded using surface tension; d) the end of the transparent substrate is mechanically cut; e) after UV cure resin or thermosetting resin (two-liquid-mixed epoxy, for example) is dropped or applied on the end of the transparent substrate and rounded by using surface tension followed by ultraviolet rays or heat application for curing.

Tenth Embodiment

Figure 10A:
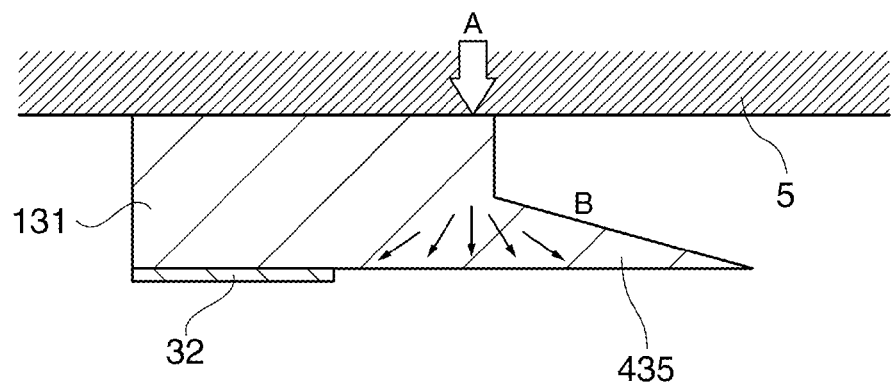
FIG. 10A is a diagram showing an end of a transparent substrate 131 used in a tenth embodiment.
Figure 10B:
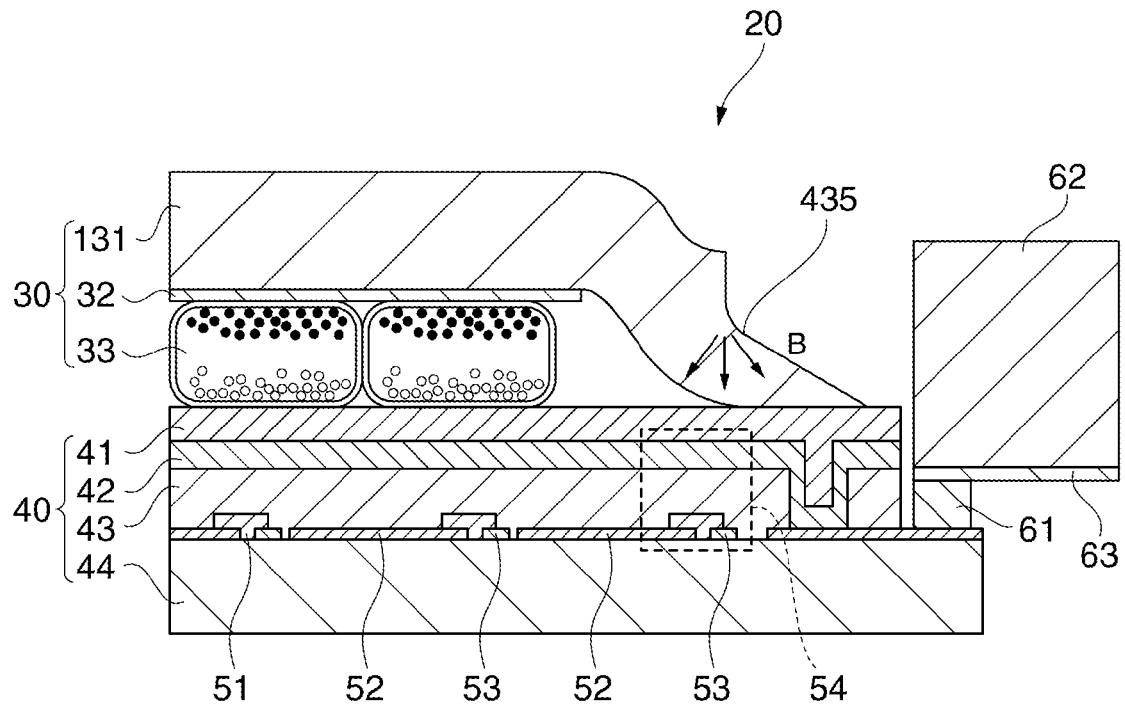
FIG. 10B is a sectional view showing a part of an electrophoretic display device 20 in the tenth embodiment.

FIG. 10A is a diagram showing an end of a transparent substrate 131 used in a tenth embodiment. FIG. 10B is a sectional view showing a part of an electrophoretic display device 20 used therein.

The electrophoretic display device 20 in the tenth embodiment has the transparent substrate 131 instead of the transparent substrate 31 in the fifth embodiment. This is the only difference between the fifth embodiment and the tenth embodiment.

As shown in FIG. 10A, a lower part of the end of the transparent substrate 131 having the transparent electrode layer 32 has a splayed-out portion 435. When the electrophoretic display sheet 30 is attached to the driving substrate 40, pressure shown by Arrow A is applied onto the end of the transparent substrate 131 by a processing member 5. This pressure is dispersed along the splayed-out portion 435 as shown by Arrow B.

As shown in FIG. 10B, when the electrophoretic display sheet 30 is attached to the driving substrate 40, the splayed-out portion 435 comes in contact with the upper surface of the driving substrate 40. Since the transparent substrate 131 is flexible, a part or whole part of the splayed-out portion comes in surface contact with an upper surface of the end of the driving substrate 40 in the contact area.

In the tenth embodiment, the lower part of the end of the transparent substrate 131 comes in surface contact with the surface of the driving substrate 40. Therefore, stress on the driving substrate 40 caused when the electrophoretic display sheet 30 is attached to the driving substrate 40 is reduced, and damage to the driving circuit is prevented.

[Electronic Apparatus]

An electronic apparatus according to another embodiment includes the electrophoretic display device mentioned above. An electronic apparatus here includes any apparatuses provided with a display using a electrophoretic material such as display devices, television devices, electronic books, electronic papers, watches, electronic notebooks, calculators, mobile phones and portable information terminals. Further, although these are not categorized as apparatuses, flexible paper-like or film-like matter, or immovables such as a wall surface having such matter attached, and mobile bodies such as vehicles, aircraft, and vessels are included.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a wide variety of ways. This disclosure is intended to cover any adaptations or variations of the embodiments discussed herein. Therefore, it is manifestly intended that embodiments in accordance with the present disclosure be limited only by the claims and the equivalents thereof.

What is claimed is:

1. A driving substrate, comprising:
   a substrate including a first portion and a second portion formed surrounding the first portion;
   a semiconductor circuit layer disposed on the first portion;
   a wiring layer disposed above the semiconductor circuit layer;
   a protective layer disposed on the wiring layer; and
   a flexible printed circuit formed above the second portion, the flexible printed circuit including a protruding portion extending to the first portion, the protruding portion overlapping at least a portion of the protective layer.

2. The driving substrate according to claim 1, wherein the flexible printed circuit and the protruding portion include a same material.

3. The driving substrate according to claim 1, wherein the protruding portion is a protection sheet and the protection sheet is formed extending from a surface of the flexible printed circuit to the first portion of the substrate.

4. The driving substrate according to claim 1, wherein the protruding portion is a part of the flexible printed circuit.

5. The driving substrate according to claim 1, wherein the protruding portion protrudes in a direction of the first portion of the substrate.

6. The driving substrate according to claim 1, wherein the first portion includes an electrode.

7. The driving substrate according to claim 1, wherein a thickness (d1) of the flexible printed circuit above the first portion is smaller than a thickness (d2) of the flexible printed circuit above the second portion.

8. A driving substrate, comprising:
   a substrate including a first portion and a second portion formed surrounding the first portion;
   a semiconductor circuit layer disposed on the first portion;
   a wiring layer disposed above the semiconductor circuit layer;
   a protective layer disposed on the wiring layer;
   a flexible printed circuit formed above the second portion; and
   a protection sheet formed above the flexible printed circuit, the protection sheet extending to the first portion of the substrate, the protection sheet overlapping at least a portion of the protective layer.

9. A driving substrate, comprising:
   a substrate including a first portion and a second portion formed surrounding the first portion;
   a semiconductor circuit layer disposed on the first portion;
   a wiring layer disposed above the semiconductor circuit layer;
   a protective layer disposed on the wiring layer; and
   a flexible printed circuit formed above the second portion, the flexible printed circuit being electrically connected to the semiconductor circuit layer at the second portion.

* * * * *